United States Patent [19]

Meister

[11] Patent Number: 4,931,527
[45] Date of Patent: Jun. 5, 1990

[54] WATER SOLUBLE GRAFT COPOLYMERS OF LIGNIN, METHODS OF MAKING THE SAME AND USES THEREFORE

[76] Inventor: John J. Meister, 31675 Westlady Rd., Beverly Hills, Mich. 48010-5624

[21] Appl. No.: 286,344

[22] Filed: Dec. 19, 1988

[51] Int. Cl.$^5$ .......................... C08G 59/00; C09K 7/00
[52] U.S. Cl. ..................... 527/400; 523/130; 523/131; 252/8.551; 252/8.554
[58] Field of Search ............... 527/400, 401; 523/130, 523/131; 252/8.551, 8.554

[56] References Cited

U.S. PATENT DOCUMENTS

| | | | |
|---|---|---|---|
| 3,388,061 | 6/1968 | Markham | 527/403 |
| 3,985,659 | 10/1976 | Felicetta et al. | 524/72 |
| 4,322,301 | 3/1982 | Balckmore | 252/8.511 |
| 4,342,645 | 8/1982 | Fletcher et al. | 208/184 |
| 4,687,828 | 8/1987 | Meister et al. | 527/400 |

*Primary Examiner*—Nathan M. Nutter
*Attorney, Agent, or Firm*—Barnes, Kisselle, Raisch, Choate, Whittemore & Hulbert

[57] ABSTRACT

A water-soluble graft copolymer of lignin-(2-propenamide)-(4n,4n-dimethyl-4-ammoniumhept-1,6-diene chloride) having a central lignin network and at least one grafted side chain, R, having randomly repeating units of the formulas:

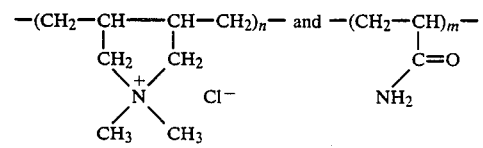

such that the central lignin network has a molecular weight of about 1,000 to 150,000 and the total number of randomly repeating units in the grafted side chain or chains is in the range of 5 to 300,000 such that the total copolymer molecular weight is in the range of 1,000 to 30,000,000.

27 Claims, No Drawings

WATER SOLUBLE GRAFT COPOLYMERS OF LIGNIN, METHODS OF MAKING THE SAME AND USES THEREFORE

FIELD OF INVENTION

The present invention relates to water-soluble graft copolymers of lignin (2-propenamide)-(4N,4N-dimethyl-4-ammoniumhept-1,6-diene chloride) method of making the same and uses therefore.

BACKGROUND OF THE INVENTION

Aqueous solutions which flow at a controlled rate under a given shear stress are required throughout a variety of industrial applications. Such control of viscosity of water is achieved by adding to water agents such as clays, large amounts of polar organic compounds such as polyacrylates or high concentrations of salts With the appropriate additives, these aqueous solutions can suspend large amounts of solid phase and form a thermodynamically stable mixture. These aqueous solutions suspend finely divided solids and will flow slowly when exposed to shear stress Such solutions, free of solids, also flow more uniformly in situations where numerous paths providing different resistances to flow are open to the fluids.

However, each of these conventional agents has attendant disadvantages, particularly when used to recover oil from subterranean wells. The application of these agents to flow control and flocculation-deflocculation control requires careful adjustment of the concentration of an active agent in the solution and control of adsorption of the active agent onto suspended solids or the matrix of a porous media. Such control is impossible when negatively charged agents are introduced into systems containing positively-charged surfaces such as calcite. The negatively-charged agents are completely adsorbed onto the solid Further, if the solution contains divalent cations, the negatively-charged agents associate with the cations and precipitate. Where the treatment or process solution is basic (pH greater than 7.0) there is a tendency of many polymers to hydrolyze to different chemical compositions. Hydrolysis reactions, which convert amides to acids and esters to separated acid-alcohol reagents, are very damaging to the performance of polymers which are susceptible to them. Hence, a need continues to exist for new agents which are capable of suitably thickening water and aqueous solutions to produce aqueous solutions having the desirable properties as outlined below but which are free of attendant disadvantages.

SUMMARY OF THE INVENTION

A water-soluble graft copolymer of lignin-(2-propenamide)-(4N,4N-dimethyl-4-ammoniumhept-1,6-diene chloride), particularly useful in recovering oil from subterranean wells, having a central lignin network and at least one grafted side chain, R, having randomly repeating units of the formulas:

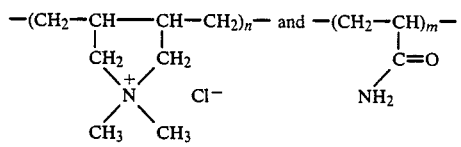

such that the central lignin network has a molecular weight of about 1,000 to 150,000 and the total number of random units in the grafted side chain or chains is in the range of 5 to 300,000 units, such that the total copolymer molecular weight is in the range of 1,000 to 30,000,000.

Objects, features and advantages of the present invention are to provide a positively-charged lignin graft copolymer; provide simplistic and reliable processes for preparing such lignin graft copolymer; provide a method for using a positively-charged lignin graft copolymer in preparing highly viscous, aqueous solutions which are particularly useful in oil recovery from subterranean wells into carbonate reservoirs; and to provide a method of boosting or enhancing polymer molecular weights during polymerization reactions.

DETAILED DESCRIPTION OF THE PREFERRED EMBODIMENTS

In accordance with the present invention, there is provided a high molecular weight graft copolymer containing lignin as the backbone network and poly((1-amidoethylene)-co(methylene 1N,1N-dimethyl-1-ammoniumcyclopenta-3,4-diyl chloride methylene)) as the grafted side chain.

Lignin is derived from woody plants. In fact, after cellulose, it is the principal constituent of the woody structure of higher plants. Lignin, which makes up about 25% of the weight of dry wood, acts as a cementing agent to bind the matrix of cellulose fibers together into a rigid woody structure. See *Biochemistry* by A. L. Lehninger (Worth Publishers, 1970).

Moreover, lignin sources are abundant. Although the wood and bark waste from the lumber industry and wastes from agricultural operations could provide extremely large quantities of lignin, perhaps the most accessible, albeit smaller, source is the pulp and paper industry. For example, for 1978, it has been estimated that the U.S. chemical-pulp industry produced $1.55 \times 10^7$ tons of alkali lignin and $1.6 \times 10^6$ tons of lignosulfonic acids See *Encyclopedia of Chemical Technology*, vol. 14 (Kirk-Othmer, 1981).

In general, the molecular structure of the repeating lignin units and the appropriate numbering thereof is as follows:

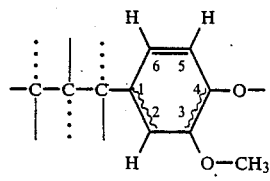

It appears that, regardless of origin, lignin is a complex, oxyphenylpropene polymer In the natural state, lignin is a highly branched and partially cross-linked polymer However, there appears to be some structural variation in branching depending upon whether the lignin is derived from coniferous or deciduous species or from bark, cambium, sapwood or heartwood. During recovery, the lignin is chemically altered and is available in relatively pure form as a derivative having a molecular weight of about 1,000 to 150,000. Suitable lignins which may be used according to the present invention are alkali lignins, HCl lignins, milled wood lignins (MWL) and 1,4-dioxane lignins, for example.

Alkali lignins are used in the examples of this application. However, reactions can be run on solvent-extracted lignin, kraft lignin, pine lignin, aspen lignin and steam-exploded lignin. Alkali lignins are tan, brown or black powders. When free of metal cations such as sodium or potassium, alkali lignins are water-insoluble materials and are commonly called "free acid" or "acid free" lignin. When containing metal cations, such as sodium or potassium, the alkali lignins are slightly water soluble materials which increase in water solubility as the pH increases from 7 toward 14 and become completely soluble in 5 wt% aqueous sodium hydroxide solutions. Alkali lignins have, as a basic repeating unit, the oxyphenylpropyl unit.

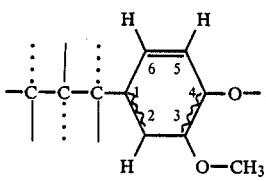

The aromatic ring is often alkoxy substituted, as shown, and the propene group often has a hydroxyl group attached in place of one hydrogen. Alkyl groups appear on some of the aromatic groups of the polymer and sulfur may be chemically bound to parts of the polymer, though few, if any, sulfonate groups occur.

Bonding between repeat units in alkali lignin is complex and involves carbon-carbon bonds between aromatic and/or alkyl carbons as well as ether bonds between aromatic and/or alkyl carbons. Labile hydrogens exist in the material and may be replaced by metal cations, such as sodium, potassium, calcium, or ammonium ions, to form alkali lignin salts. Alkali lignins are readily identified by method of production and are a familiar class of compounds to those versed in the paper making art.

In accordance with the present invention, to the lignin macromolecule, possibly to the aromatic ring of the oxyphenylpropene moiety, is grafted repeating units of 1-amidoethylene:

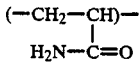

in combination with repeating units of methylene 1N,1N-dimethyl-1-ammoniumcyclopenta-3,4-diyl chloride methylene:

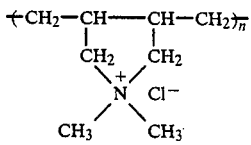

For example, when using alkali lignins in accordance with the present invention, a lignin graft copolymer of the following formula is produced:

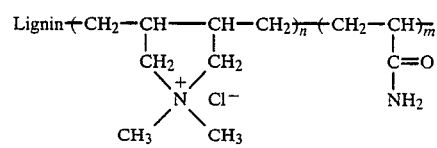

In this structural formula, the subscripts m and n are used to show that large numbers of these repeat units can be attached to the lignin backbone but the formula does not mean that these repeat units occur in strings of one type followed by strings of another type. Usually, the graft copolymers formed have random copolymer sidechains with the two repeat units occurring in random sequence in the chain.

The preparation of this copolymer is accomplished, in general, under oxygen-free conditions by adding a redox initiator, a chloride salt, 2-propenamide, and 4N,4N-dimethyl-(4-ammoniumhept-1,6-diene chloride to a lignin dispersion in a suitable solvent and allowing time for graft polymerization to occur.

Preparation of alkali lignin-(2-propenamide)-(4N,4N-dimethyl-4-ammoniumhept-1,6-diene chloride) graft copolymer in dimethylsulfoxide, $(CH_3)_2SO$, will now be illustrated for a sample composed of between 0.32 and 3.0 weight percent lignin, 0.2 and 7.6 weight percent 2-propenamide, 0.2 and 7.9 weight percent 4N,4N-dimethyl-4-ammoniumhept-1,6-diene chloride, 0.6 to .15.3 weight percent calcium chloride, 0.0 to 6.1 weight percent aqueous solution of cerium (+IV), and 60 to 97 weight percent solvent.

Significant variation in reaction mixture composition is possible as will be illustrated in the examples to follow. The synthesis method for these copolymers will now be described, generally.

As a suitable solvent for the graft copolymerization of the present invention, it should be noted that, in general, organic solvents are used and, of these, the polar, aprotic solvents are preferred. Particularly noteworthy are the solvents dimethyl sulfoxide (DMSO), dimethyl acetamide (DMAc), dimethyl formamide (DMF), 1,4-dioxane, 1-methyl-2-pyrrolidianone and pyridine. Of course, mixtures of these solvents can also be used such as 50/50 (vol/vol) mixtures of DMSO and 1,4-dioxane. However, it is also possible to use 50/50 (vol/vol) mixtures of one of the above solvents, such as DMSO, with water.

An aliquot of 20 mL of purified solvent is placed in a 125 mL conical flask. Lignin and finely ground anhydrous calcium chloride are added to the pure solvent and the mixture is stirred for about 20 minutes while being bubbled with nitrogen to provide a substantially oxygen-free environment. After 10 minutes of nitrogen saturation, a hydroperoxide such as hydrogen peroxide or 2-hydroperoxy-1,4-dioxycyclohexane is added to the reaction mixture. This addition can be made by adding an aqueous solution of the peroxide for safe handling or the peroxide can be added directly. Solid 2-propenamide and a nitrogen-saturated solution of 4N,4N-dimethyl-4-ammoniumhept-1,6-diene chloride in solvent are added while nitrogen gas is bubbled into the mixture. The 2-propenamide can also be added in a nitrogen-saturated solution in solvent. After about 10 minutes, a sufficient volume of 0.05M ceric sulfate in water may be added, the flask is sealed under nitrogen, and the slurry is stirred for 10 more minutes. The reaction starts immediately. The flask contents will often thicken slowly but may even solidify into a precipitate-laden, viscous slurry.

The reaction flask is placed in a 30° C. bath and allowed to sit for two days. The reaction is then terminated with 0.5 mL of 1 wt % of hydroquinone in water. The reaction mixture is diluted with 100 mL of water and stirred until a uniform reaction product is precipitated by adding the dilute reaction mixture dropwise to 1 liter of 2-propanone or other suitable nonsolvent for the graft copolymer. The solid is recovered from 2-propanone by filtration and dried under vacuum at 40° C. To obtain a higher purity product which is more readily soluble, the reaction product is recovered from nonsolvent by filtration and redissolved in water. The aqueous solution is dialyzed against pure water using a 3,500-upper-molecular-weight-permeable, dialysis membrane for several days The polymer solution is centrifuged at 6000 rpm for 35 minutes to sediment the precipitate and the supernate, pure polymer solution is poured off. The aqueous solution containing the solid is then freeze-dried.

It is preferred that all reagents used be of reagent grade purity but less pure materials may be used if they do not contain inhibitors for the reaction. Other concentrations of cerium (+IV) ion solution in other non-reactive solvents can be used to add this reagent to the reaction and, indeed, this reagent is not necessary for the reaction. The 0.05M cerium (+IV) sulfate solution is stable and convenient to use, however. The concentration of the ceric sulfate solution used can vary from about 0.01M to 0.3M. Other reagents that may be used in place of ceric ion ($Ce^{4+}$) include vanadium ($V^{+5}$) or manganese ions ($Mn^{3+}$, $Mn^{4+}$, $Mn^{7+}$). It is preferred that the metal salt be added as an aqueous solution. Moreover, ceric salts are a preferred reagent for the graft polymerization. The reaction can be run without adding cerium or other oxidizing metal ions but slightly higher yields and better solubility properties are obtained when the oxidizing metal ion is added. The graft copolymer can and will be produced if this reagent is not added to the synthesis mixture but product properties are improved by the addition of cerium(+4) solution. Other changes in this procedure, evident to those skilled in synthesis or chemical manufacture can be made The graft copolymer can also be produced by adding nitrogen-saturated 2-propenamide to the reaction mixture in another solvent.

Other hydroperoxides, such as inorganic hydroperoxides or t-butyl hydroperoxide, may be used in place of the hydrogen peroxide listed above. The graft copolymerization reaction can be conducted with or without stirring once the monomer and metal salt have been dispersed in the reaction mixture. The reaction is allowed to proceed for 1 to 200 hours, with 48 hours being a typical reaction time. It is preferred to terminate the copolymerization by addition of a free radical scavenger such as hydroquinone.

The graft terpolymer is easily recovered from a liquid reaction mixture. If the reaction mixture is a gel or thick slurry, it can be made pourable by mixing therewith 1 to 3 times its volume of distilled or deionized water under low shear conditions until a homogeneous, pourable system is formed. The reaction mixture is added to 2-20, preferably 5-10 times its volume of a nonsolvent for the polymer, such as 2-propanone. Preferably the nonsolvent is stirred vigorously so as to form a vortex and the copolymer solution is slowly drained directly into the center of this vortex. The precipitated graft copolymer is then removed from the nonsolvent solution by filtration, washed with nonsolvent, filtered, and vacuum-dried to a constant weight. A purer product can be obtained by the dialysis-freeze drying process described above.

The following examples illustrate certain embodiments of this invention wherein parts and percentages are by weight and temperatures are in centigrade unless otherwise indicated. Indulin AT, a commercial lignin product of the Westvaco Corporation, and Eastman reagent-grade 2-propenamide were used in these syntheses. The compound 4N,4N-dimethyl-4-ammonium-hept-1,6-diene chloride was synthesized and purified by recrystallization in 2-propanone before use. Paradioxane and dimethyl sulfoxide, of reagent grade, from Mallinckrodt Chemical Company and anhydrous calcium chloride also therefrom were used in these experiments. Ceric sulfate solution was prepared from reagent grade ceric sulfate and distilled water. The hydroquinone solution was 1 wt % hydroquinone in distilled water.

The synthesis procedure for 4N,4N-dimethyl-4-ammoniumhept-1,6-diene chloride is as follows: a sample of 2N-methyl-2-iminopent-4-ene was obtained from Virginia Chemical Inc., 3340 West Norfolk Road, Portsmouth, Va. 23703 and a sample of 3-chloroprop-1-ene was obtained from Dow Chemical Company, Technical Service and Development Section, D1603 Building, Highway 288, Freeport, Tex. 77541. Both samples were further purified by distillation, storage of the center cut of the distillate over active carbon, repeat distillation, and storage of the pure product in a stoppered flask in a refrigerator. Synthesis was conducted at or below 35° C. A stoichiometric amount of 3-chloroprop-1-ene and 2N-methyl-2-iminopent-4-ene were added to 12 times as many moles of 2-propanone under a dry nitrogen atmosphere. The crude reaction product was concentrated after 24 hours of sitting by distilling off 2-propanone using a rotary evaporator. The concentrated solution was cooled from 50° C. to 0° C. and a mass of white, needle-like crystals collected under dry atmosphere. The product was recrystallized from ethanol-(2-propanone)(10 to 90 parts mixture by volume) and the pure product was (1) dried under vacuum and (2) stored in a freezer.

The limiting viscosity number of the produce in pure water was determined using the Fuoss equation (a) to extrapolate several viscosity measurements to zero polymer concentration.

$$C/\eta_{sp} = 1/[\eta] + Q_f C^{\frac{1}{2}} \tag{a}$$

Here $\eta_{sp} = (\eta - \eta_o)/\eta_o$, C is polymer concentration in g/dL, $Q_f$ is a fitting constant, and $[\eta]$ is limiting viscosity number. See *J. Poly. Sci.*, 3, 603–604 (1948).

The present invention will now be further illustrated by certain examples and references which are provided for purposes of illustration only and are not intended to limit the present invention.

Yield in the following examples is calculated from the formula: (g=grams)

$$\text{weight percent yield} = \frac{\text{(g polymer recovered)}}{\text{g lignin + g monomer added added}}$$

EXAMPLES

EXAMPLE 1

A total of 0.666 g of lignin and 0.334 g of calcium chloride were placed in a 125 mL erlenmeyer flask containing 12 g of dimethylsulfoxide. The mixture was stir-bubbled with nitrogen ($N_2$) for about 2 minutes before 0.65 g of aqueous, 30 percent hydrogen peroxide were added to the reaction mixture. $N_2$ was bubbled through the reaction mixture and the system was stirred for about 10 minutes. During this time, two solutions of monomers were being saturated with nitrogen After the 10 minutes of bubbling and stirring, 1.33 g of 2-propenamide (monomer I) in 5 g of dimethylsulfoxide was added After about 2 minutes of stirring and $N_2$ bubbling, 0.58 g of 4N,4N-dimethyl- 4-ammoniumhept-1,6-diene chloride (monomer II) and 0.59 g of 2-propenamide (I) in 11.37 g of dimethylsulfoxide were added. After about 5 minutes of stirring and bubbling $N_2$ through the reaction mixture, the flask was stoppered and stored in a 30° C. bath for 2 days. The mole ratio of chloride ion to hydroperoxide was 1.68. The solids content of the reaction was 10.98 weight percent. The mole ratio of monomer I to monomer II in the reaction mixture was 88 to 12. The reaction was then terminated by adding 0.5 mL of 1% hydroquinone and 100 mL of water thereto. The stirred reaction mixture was precipitated in 1 L of 2-propanone and recovered by filtration. The recovered solid was dried to constant weight under vacuum and bottled. The product was labeled 24-31-1. Yield was 1.44 g or 45.55 wt %. Weight percent methylene 1N,1N-dimethyl-1-ammoniumcyclopenta-3,4-diyl chloride methylene repeat units in the product was 13 14% as determined by chloride content in the product. Weight percent 1-amidoethylene repeat units in the product was 68.15%, the lignin content was 13.01%, the nitrogen content was 14.56% and the chloride content was 2.87%. The limiting viscosity number of the copolymer in distilled water at 30° C. was 3.02 dL/g using the Fuoss Equation (See *J. Poly, Sci.*, 3, 603–604 (1948)).

EXAMPLE 2

A total of 0.666 g of lignin and 0.334 g of calcium chloride were placed in a 125 mL erlenmeyer flask containing 12 g of dimethylsulfoxide. The mixture was stir-bubbled with nitrogen ($N_2$) for about 2 minutes before 0.65 g of aqueous, 30 percent hydrogen peroxide were added to the reaction mixture. $N_2$ was bubbled through the reaction mixture and the system was stirred for about 10 minutes. During this time, two solutions of monomers were being saturated with nitrogen. After the 10 minutes of bubbling and stirring, 1.33 g of 2-propenamide (I) in 5 g of dimethylsulfoxide was added. After about 2 minutes of stirring and $N_2$ bubbling, 0.58 g of 4N,4N-dimethyl-4-ammoniumhept-1,6-diene chloride (II) and 0.59 g of 2-propenamide (I) in 11.43 g of dimethylsulfoxide were added. Next, a sample of 0.9 mL of a $1.65 \times 10^{-3}$ weight percent disodium ethylenediaminetetraacetic acid solution in dimethylsulfoxide was added. After about 5 minutes of stirring and bubbling $N_2$ through the reaction mixture, the flask was stoppered and stored in a 30° C. bath for 2 days. The mole ratio of chloride ion to hydroperoxide was 1.68. The solids content of the reaction was 10.96 weight percent The mole ratio of monomer I to monomer II in the reaction mixture was 88 to 12. The reaction was then terminated by adding 0.5 mL of 1% hydroquinone and 100 mL of water thereto. The stirred reaction mixture was precipitated in 1 L of 2-propanone and recovered by filtration. The recovered solid was dried to constant weight under vacuum and bottled. The product was labeled 24-31-2. Yield=55.25 wt % or 1.81 g. Weight percent methylene 1N,1N-dimethyl-1-ammoniumcyclopenta- 3,4-diyl chloride methylene repeat units in the product was 10.23% as determined by chloride content in the product. Weight percent 1-amidoethylene repeat units in the product was 70.56%, the lignin content was 9.72%, the nitrogen content was 14.78% and the chloride content was 2.25%. The limiting viscosity number of the copolymer in distilled water at 30° C. was 1.68 dL/g using the Fuoss Equation.

EXAMPLE 3

A total of 0.666 g of lignin and 0.334 g of calcium chloride were placed in a 125 mL erlenmeyer flask containing 12 g of dimethylsulfoxide. The mixture was stir-bubbled with nitrogen ($N_2$) for about 2 minutes before 0.65 g of aqueous, 30 percent hydrogen peroxide were added to the reaction mixture. $N_2$ was bubbled through the reaction mixture and the system was stirred for about 10 minutes. During this time, two solutions of monomers were being saturated with nitrogen. After the 10 minutes of bubbling and stirring, 1.33 g of 2-propenamide (I) in 5 g of dimethylsulfoxide was added. After about 2 minutes of stirring and $N_2$ bubbling, 0.19 g of 4N,4N-dimethyl-4-ammoniumhept-1,6-diene chloride (II) and 0.20 g of 2-propenamide (I) in 11.94 g of dimethylsulfoxide were added. After about 5 minutes of stirring and bubbling $N_2$ through the reaction mixture, the flask was stoppered and stored in a 30° C. bath for 2 days The mole ratio of chloride ion to hydroperoxide was 1.25. The solids content of the reaction was 8.59 weight percent. The mole ratio of monomer I to monomer II in the reaction mixture was 95 to 5. The reaction was then terminated by adding 0.5 mL of 1% hydroquinone and 100 mL of water thereto. The stirred reaction mixture was precipitated in 1 L of 2-propanone and recovered by filtration. The recovered solid was dried to constant weight under vacuum and bottled. The product was labeled 24-31-3. Yield was 1.12 g or 46.94 wt %. Weight percent methylene 1N,1N-dimethyl-1-ammoniumcyclopenta-3,4-diyl chloride methylene repeat units in the product was 6.02% as determined by chloride content in the product. Weight percent 1-amidoethylene repeat units in the product was 72.87%, the lignin content was 7.59%, the nitrogen content was 14.87% and the chloride content was 1.32%. The limiting viscosity number of the copolymer in distilled water at 30° C. was 0.589 dL/g using the Fuoss Equation.

EXAMPLE 4

A total of 0.666 g of lignin and 0.334 g of calcium chloride were placed in a 125 mL erlenmeyer flask containing 12 g of dimethylsulfoxide. The mixture was stir-bubbled with nitrogen ($N_2$) for about 2 minutes before 0.65 g of aqueous, 30 percent hydrogen peroxide were added to the reaction mixture. $N_2$ was bubbled through the reaction mixture and the system was stirred for about 10 minutes. During this time, two solutions of monomers were being saturated with nitrogen. After the 10 minutes of bubbling and stirring, 1.33 g of 2-propenamide (I) in 5 g of dimethylsulfoxide was added. After about 2 minutes of stirring and $N_2$ bubbling, 0.85 g of 4N,4N-dimethyl-4-ammoniumhept-1,6-diene chloride (II) and 0.20 g of 2-propenamide (I) in 13.51 g of dimethylsulfoxide were added. Next, a sample of 1.0 mL of a $1.65 \times 10^{-3}$ weight percent disodium ethylenediaminetetraacetic acid solution in dimethylsulfoxide was added. After about 5 minutes of stirring and bubbling $N_2$ through the reaction mixture, the flask was stoppered and stored in a 30° C. bath for 2 days. The mole ratio of chloride ion to hydroperoxide was 2.98. The solids content of the reaction was 9.95 weight percent. The mole ratio of monomer I to monomer II in the reaction mixture was 80 to 20. The reaction was then terminated by adding 0.5 mL of 1% hydroquinone and 100 mL of water thereto. The stirred reaction mixture was precipitated in 1 L of 2-propanone and recovered by filtration. The recovered solid was dried to constant weight under vacuum and bottled. The product was labeled 24-31-4. Yield=34.94 wt % or 1.21 g. Weight percent methylene 1N,1N-dimethyl-1-ammoniumcyclopenta-3,4-diyl chloride methylene repeat units in the product was 15.83% as determined by chloride content in the product. Weight percent 1-amidoethylene repeat units in the product was 66.17%, the lignin content was 10.34%, the nitrogen content was 14.41% and the chloride content was 3.48%.

Note that these four examples, numbers 1 to 4, show that different mole ratios of monomers can be used to produce product in significant yields and the chloride ion content of the reaction product confirms the cationic nature of the polymer produced. The chloride ion content of the reaction mixture is maintained at any desired level by lowering the amount of calcium chloride added to the reaction Note also that Examples 2 and 4 show that EDTA, disodium ethylenediaminetetraacetic acid, can be added to the reaction mixture to improve yield.

EXAMPLE 5

A total of 2.01 g of lignin and 1.02 g of calcium chloride were placed in a 125 mL erlenmeyer flask containing 22 g of dimethylsulfoxide. The mixture was stir-bubbled with nitrogen ($N_2$) for about 2 minutes before 1.90 g of aqueous, 30 percent hydrogen peroxide were added to the reaction mixture. $N_2$ was bubbled through the reaction mixture and the system was stirred for about 10 minutes. During this time, two solutions of monomers were being saturated with nitrogen. After the 10 minutes of bubbling and stirring, 0.51 g of 2-propenamide (I) in 20 g of dimethylsulfoxide was added. After about 2 minutes of stirring and $N_2$ bubbling, 5.60 g of 4N,4N-dimethyl-4-ammoniumhept-1,6-diene chloride (II) and 1.94 g of 2-propenamide (I) in 39.68 g of dimethylsulfoxide were added. After about 5 minutes of stirring and bubbling $N_2$ through the reaction mixture, the flask was stoppered and stored in a 30° C. bath for 2 days. The mole ratio of chloride ion to hydroperoxide was 3.164. The solids content of the reaction was 11.95 weight percent. The mole ratio of monomer I to monomer II in the reaction mixture was 1 to 1. The reaction was then terminated by adding 0.5 mL of 1% hydroquinone and 100 mL of water thereto. The stirred reaction mixture was precipitated in 1 L of 2-propanone and recovered by filtration. The recovered solid was dried to constant weight under vacuum and bottled. The product was labeled 24-13-2. Yield was 2.20 g or 21.86 wt %. Weight percent methylene 1,1-dimethyl-1-ammoniumcyclopenta-3,4-diyl chloride methylene repeat units in the product was 20.26% as determined by chloride content in the product. Weight percent 1-amidoethylene repeat units in the product was 39.68%, the lignin content was 2.95%, the nitrogen content was 9.57% and the chloride content was 4.45%. The limiting viscosity number of the copolymer in distilled water at 30° C. was 3.63 dL/g using the Fuoss Equation.

EXAMPLE 6

A total of 0.665 g of lignin and 0.332 g of calcium chloride were placed in a 125 mL erlenmeyer flask containing 12 g of dimethylsulfoxide The mixture was stir-bubbled with nitrogen ($N_2$) for about 2 minutes before 0.65 g of aqueous, 30 percent hydrogen peroxide were added to the reaction mixture. $N_2$ was bubbled through the reaction mixture and the system was stirred for about 10 minutes. During this time, two solutions of monomers were being saturated with nitrogen. After the 10 minutes of bubbling and stirring, 1.39 g of 2-propenamide (I) in 5 g of dimethylsulfoxide was added. After about 2 minutes of stirring and $N_2$ bubbling, 1.03 g of 4N,4N-dimethyl-4-ammoniumhept-1,6-diene chloride (II) and 0.96 g of 2-propenamide (I) in 12.28 g of dimethylsulfoxide were added. Next, a sample of 1.30 mL of a $1.65 \times 10^{-3}$ weight percent disodium ethylenediaminetetraacetic acid solution in dimethylsulfoxide was added. After about 5 minutes of stirring and bubbling, $N_2$ through the reaction mixture, the flask was stoppered and stored in a 30° C. bath for 2 days. The mole ratio of chloride ion to hydroperoxide was 2.15. The solids content of the reaction was 13.00 weight percent. The mole ratio of monomer I to monomer II in the reaction mixture was 85 to 15. The reaction was then terminated by adding 0.5 mL of 1% hydroquinone and 100 mL of water thereto. The stirred reaction mixture was precipitated in 1 L of 2-propanone and recovered by filtration. The recovered solid was dissolved in 100 mL of water and dialyzed against water for 3 days. The dilute reaction product in the dialysis tube was recovered by freeze drying and found to weigh 2.77 g. The product was labeled 24-37-1. Yield=68.43 wt %. Weight percent methylene 1,1-dimethyl-1-ammoniumcyclopenta-3,4-diyl chloride methylene repeat units in the product was 12.01% as determined by chloride content in the product. Weight percent 1-amidoethylene repeat units in the product was 69.28%, the lignin content was 22.17%, the nitrogen content was 14.68% and the chloride content was 2.64%. The limiting viscosity number of the copolymer in distilled water at 30° C. was 3.76 dL/g using the Fuoss Equation.

EXAMPLE 7

A total of 0.652 g of lignin and 0.325 g of calcium chloride were placed in a 125 mL erlenmeyer flask containing 12 g of dimethylsulfoxide The mixture was stir-bubbled with nitrogen ($N_2$) for about 2 minutes before 0.65 g of aqueous, 30 percent hydrogen peroxide were added to the reaction mixture $N_2$ was bubbled through the reaction mixture and the system was stirred for about 10 minutes. During this time, two solutions of monomers were being saturated with nitrogen. After the 10 minutes of bubbling and stirring, 1.43 g of 2-propenamide (I) in 5 g of dimethylsulfoxide was added. After about 2 minutes of stirring and $N_2$ bubbling, a 1.25 g of 4N,4N-dimethyl-4-ammoniumhep-1,6-diene chloride (II) and 0.82 g of 2-propenamide (I) in 11.23 g of dimethylsulfoxide were added. Next, a sample of 1.50 mL of a $1.65 \times 10^{-3}$ weight percent disodium ethylenediaminetetraacetic acid solution in dimethylsulfoxide was added. After about 5 minutes of stirring and bubbling N$_2$ through the reaction mixture, the flask was stoppered and stored in a 30° C. bath for 2 days. The mole ratio of chloride ion to hydroperoxide was 2.37. The solids content of the reaction was 13.90 weight percent. The mole ratio of monomer I to monomer II in the reaction mixture was 4 to 1. The reaction was then terminated by adding 0.5 mL of 1% hydroquinone and 100 mL of water thereto. The stirred reaction mixture was precipitated in 1 L of 2-propanone and recovered by filtration. The recovered solid was dissolved in 100 mL of water and dialyzed against water for 3 days. The dilute reaction product in the dialysis tube was recovered by freeze drying and found to weigh 2.65 g. The product was labeled 24-37-2. Yield=63.78 wt %. Weight percent methylene 1,1-dimethyl-1-ammoniumcyclopenta-3,4-diyl chloride methylene repeat units in the product was 16.84% as determined by chloride content in the product. Weight percent 1-amidoethylene repeat units in the product was 63.50%, the lignin content was 15.47%, the nitrogen content was 13.78% and the chloride content was 3.70%. The limiting viscosity number of the copolymer in distilled water at 30° C. was 4.02 dL/g using the Fuoss Equation.

EXAMPLE 8

A total of 0.678 g of lignin and 0.338 g of calcium chloride were placed in a 125 mL erlenmeyer flask containing 12 g of dimethylsulfoxide. The mixture was stir-bubbled with nitrogen (N$_2$) for about 2 minutes before 0.65 g of aqueous, 30 percent hydrogen peroxide were added to the reaction mixture. N$_2$ was bubbled through the reaction mixture and the system was stirred for about 10 minutes. During this time, two solutions of monomers were being saturated with nitrogen. After the 10 minutes of bubbling and stirring, 1.55 g of 2-propenamide (I) in 5 g of dimethylsulfoxide was added. After about 2 minutes of stirring and N$_2$ bubbling, 1.03 g of 4N,4N-dimethyl-4-ammoniumhept-1,6-diene chloride (II) and 0.65 g of 2-propenamide (I) in 11.82 g of dimethylsulfoxide were added. Next, a sample of 1.90 mL of a $1.65 \times 10^{-3}$ weight percent disodium ethylenediaminetetraacetic acid solution in dimethylsulfoxide was added. After about 5 minutes of stirring and bubbling N$_2$ through the reaction mixture, the flask was stoppered and stored in a 30° C. bath for 2 days. The mole ratio of chloride ion to hydroperoxide was 2.74. The solids content of the reaction was 13.91 weight percent. The mole ratio of monomer I to monomer II in the reaction mixture was 75 to 25. The reaction was then terminated by adding 0.5 mL of 1% hydroquinone and 100 mL of water thereto. The stirred reaction mixture was precipitated in 1 L of 2-propanone and recovered by filtration. The recovered solid was dissolved in 100 mL of water and dialyzed against water for 3 days. The dilute reaction product in the dialysis he product was labeled 24-37-3. Yield=51.37 wt %. Weight percent methylene 1,1-dimethyl-1-ammoniumcyclopenta-3,4-diyl chloride methylene repeat units in the product was 17.67% as determined by chloride content in the product. Weight percent 1-amidoethylene repeat units in the product was 56.34%, the lignin content was 11.09%, the nitrogen content was 13.3% and the chloride content was 3.88%. The limiting viscosity number of the copolymer in distilled water at 30° C. was 2.32 dL/g using the Fuoss Equation.

EXAMPLE 9

A total of 0.665 g of lignin and 0.332 g of calcium chloride were placed in a 125 mL erlenmeyer flask containing 12 g of dimethylsulfoxide. The mixture was stir-bubbled with nitrogen (N$_2$) for about 2 minutes before 0.65 g of aqueous, 30 percent hydrogen peroxide were added to the reaction mixture. N$_2$ was bubbled through the reaction mixture and the system was stirred for about 10 minutes. During this time, two solutions of monomers were being saturated with nitrogen. After the 10 minutes of bubbling and stirring, 1.39 g of 2-propenamide (I) in 5 g of dimethylsulfoxide was added. After about 2 minutes of stirring and N$_2$ bubbling, 1.88 g of 4N,4N-dimethyl-4-ammoniumhept-1,6-diene chloride (II) and 0.54 g of 2-propenamide in 15.25 g of dimethylsulfoxide were added. Next, a sample of 2.30 mL of a $1.65 \times 10^{-3}$ weight percent disodium ethylenediaminetetraacetic acid solution in dimethylsulfoxide was added. After about 5 minutes of stirring and bubbling N$_2$ through the reaction mixture, the flask was stoppered and stored in a 30° C. bath for 2 days. The mole ratio of chloride ion to hydroperoxide was 2.22 The solids content of the reaction was 14.45 weight percent. The mole ratio of monomer I to monomer II in the reaction mixture was 70 to 30. The reaction was then terminated by adding 0.5 mL of 1% hydroquinone and 100 mL of water thereto. The stirred reaction mixture was precipitated 1 L of 2-propanone and recovered by filtration. The recovered solid was dissolved in 100 mL of water and dialyzed against water for 3 days. The dilute reaction product in the dialysis tube was recovered by freeze drying and found to weigh 2.22 g. The product was labeled 24-37-4. Yield=49.61 wt %. Weight percent methylene 1N,1N-dimethyl-1-ammoniumcyclopenta-3,4-diyl chloride methylene repeat units in the product was 17.55% as determined by chloride content in the product. Weight percent 1-amidoethylene repeat units in the product was 58.40%, the lignin content was 10.70%, the nitrogen content was 13.02% and the chloride content was 3.85%.

Note that these reactions, examples 5 to 9, show that yields of more than 68.0 weight percent product can be obtained An appropriate mole ratio of chloride ion to hydroperoxide will maximize yield. The preferred range of this mole ratio for the reaction in DMSO is 2.1 to 2.8. For other solvents, reaction methods, and reaction conditions, this optimum ratio will vary. Further, these products also have different amounts of charged and uncharged repeat units in the product and that difference is produced by varying the monomer ratio between the two repeat units. In these examples, the monomer ratio of uncharged to charged reagent is varied from 1 to 1 all the way to 17 to 3.

The limiting viscosity numbers of the products produced in these examples was between 0.4 and 10 dL/g. This shows that these materials are effective viscosifiers for water. This is further demonstrated by the date of Table 1 which shows that additions of only 1 wt % or less of the present graft copolymer to water doubles or triples the viscosity thereof.

TABLE 1

VISCOSITIES OF AQUEOUS SOLUTIONS OF GRAFT TERPOLYMER

| PRODUCT FROM EXAMPLE NO. | SAMPLE NUMBER | VISCOSITY WHEN PRODUCT CONCENTRATION IN WATER IS (wt %) | | | | |
|---|---|---|---|---|---|---|
| 2 | 24-31-2 | 1.028 | 0.818 | 0.618 | 0.409 | |
| 3 | 24-31-3 | 1.579 1.105 | 1.462 0.861 | 1.326 0.677 | 1.081 0.423 | |
| 4 | 24-31-4 | 1.251 1.03 | 1.152 0.843 | 1.08 0.625 | 0.921 | |
| 5 | 24-13-2 | 1.402 1.006 | 1.313 0.772 | 1.210 0594 | .404 | .205 |
| 6 | 24-37-1 | 1.279 1.098 | 1.196 0.822 | 1.149 0.717 | .966 0.446 | .879 |
| 7 | 24-37-2 | 1.798 1.044 | 1.501 0.868 | 1.559 0.654 | 1.197 | |
| 8 | 24-37-3 | 1.658 1.04 | 1.598 0.846 | 1.43 0.64 | | |
| 9 | 24-37-4 | 1.769 1.031 1.754 | 1.625 0.778 | 1.468 0.6011 | | |

*All viscosities are in centipoise, the temperature of the solution is 30° C. and all solutions were made in distilled water. Viscosity of pure water at 30° C. = 0.7975 cp.

The data of Table 1 show that the products of this invention are effective viscosifiers for water. By increasing the viscosity and lowering the mobility of water, these compositions allow more oil to be recovered by waterflooding. The lower mobility water pushes more water ahead of it to a production well because it has a lower mobility than the oil. This capacity to lower water mobility is a major asset in increasing oil production, as is well known in the art of waterflooding. Further, the positive charge of these polymers, shown by the chloride ion content of the products, will make the materials less prone to adsorb onto positively charged surfaces such as are routinely found in solid/liquid systems such as calcite immersed in neutral (pH=7.0) water.

Further, solutions of these copolymers in pH=12 to 13, aqueous solution do not show low molecular weight materials at the column's exclusion volume when tested by size exclusion chromatography. Thus, these products do not hydrolyze easily in basic solutions as do cationic ester copolymers.

As already noted, the grafted side chain or chains are made of random units of 2-propenamide and 4N,4N-dimethyl-4-ammoniumhept-1,6-diene chloride. Of course, suitable counter anions other than chloride, such as bromide or sulfate, are considered within the scope of the present invention. Moreover, the actual content of the grafted side chain or chains depends upon the molar ratio of monomer reactants employed. According to the present invention, it is acceptable to use from about 0.5 molar % to 99.5 molar % and 99.5 molar % to 0.5 molar % of 2-propenamide and 4N,4N-dimethyl-4-ammoniumhept-1,6-diene chloride, respectively. The grafted side chain or chains appear to attach at one or more of the 2-, 5- or 6-aromatic ring positions on the oxyphenylpropene moiety. Of course the precise content of the grafted side chain or chains depends upon the contemplated use. For example, in uses where water solubility is required, more of the cationic monomer should be used. Conversely, where less ionic character is desired, more of the 2-propenamide monomer should be used.

The molecular weight of the water-soluble lignin copolymers of the present invention are in the range of about 1,000 to about 30,000,000 as determined by size exclusion chromatography using known techniques. Under the process conditions of the present invention already described, it is possible to obtain molecular weights of about 40,000 to 300,000. Under these conditions, the polymer molecular weight is generally increased by increasing the ratio of moles of monomer to moles of hydroperoxide. The converse is true when diminishing the molecular weight.

In general, the reaction occurs at room temperature with no heating being necessary. Reaction times are somewhat variable and on the order of from 1 to about 48 hours with reaction yields as high as 80 weight percent possible in about 1 hour. The preferred reaction time in a commercial or continuous process of manufacture of the copolymer is 1 to 2 hours. Although the polymerization reaction of the present invention is a free-radical polymerization, the scope of the present invention clearly extends the concept of grafting reactions to other types of polymerization reactions such as ionic or chain polymerizations.

The water-soluble lignin graft copolymer of the present invention is advantageously used as a thickening agent for water or aqueous solutions and can be used in the preparation and use of drilling fluid compositions. In this respect, U.S. Pat. Nos. 3,985,659, 4,322,301 and 4,342,645 are herein incorporated by reference in their entirety.

The water-soluble lignin graft copolymers of the present invention can also be used advantageously in a conventional manner for the enhanced recovery of oil in subterranean wells. Typically in such processes, the graft copolymer is dispersed or solubilized in injection water, the water is then injected into the subterranean formation, and the injected water is then moved through the formation acting as a hydraulic ram, thereby pushing the resident oil to a product well. It is noted that the particular amounts of the present lignin graft copolymer effective for such use as well as other particulars of this use would be within the knowledge of one skilled in the art having read the present disclosure. In general, such determinations and the technique of polymer flooding is based on mobility, wherein:

$$\text{Mobility} = K_{fil}/M_f$$

where K is the permeability of the rock or oil reservoir to the fluid, f, and wherein $M_f$ is the viscosity of the fluid, f. Thus, the mobility of the oil is $K_o/M_o$ and the mobility of the polymer solution is $K_p/M_p$. For effective flooding, the mobility ratio of the polymer solution to the oil $(K_p/M_p)/(K_o/M_o)$ to be moved must be 1.0 or greater. The preferred range is 1.05 to 1.8.

This invention was made with government support under CBT-84-17876/CBT-86-96158 awarded by the National Science Foundation. The government has certain rights in this invention.

Having now fully described this invention, it will be apparent to one of ordinary skill in the art that many changes and modifications can be made thereto without departing from the spirit or scope of the invention as set forth herein.

I claim:

1. A positively-charged water-soluble graft copolymer of lignin with a neutralizing anion, having a central lignin network and at least one grafted side chain having randomly repeating units of the formulas:

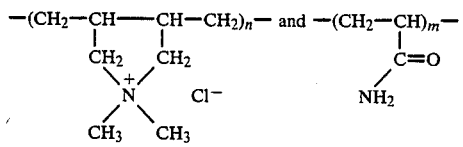

wherein the ratio of such repeating units ranges from about 0.5 molar percent to about 99.5 molar percent, and from about 0.5 molar percent to about 99.5 molar percent, respectively, such that the central lignin network has a molecular weight of about 1,000 to 150,000 and the total number of randomly repeating units in the grafted side chain or chains is in the range of 5 to 300,000 units, and such that the total graft copolymer molecular weight is in the range of 1,000 to 30,000,000.

2. A copolymer according to claim 1, wherein said lignin used as the central network is selected from the group consisting of alkali lignin, HCl lignin, milled-wood lignin and 1,4-dioxane lignin.

3. A copolymer according to claim 1, wherein said anion is selected from a group consisting of chloride, bromide and sulfate.

4. A method for preparing a positively-charged water-soluble graft copolymer of lignin which comprises free radically graft copolymerizing 2-propenamide and 4N,4N-dimethyl-4-ammoniumhept-1,6-diene chloride, bromide, or methyl sulfate on lignin and adding disodium ethylenediaminetetraacetic acid to improve yield.

5. A method according to claim 4, wherein said step of copolymerizing comprises:
(a) adding a hydroperoxide to a solvent; and
(b) adding lignin, a chloride-containing salt, 2-propenamide and 4N,4N-dimethyl-4-ammoniumhept-1,6-diene chloride, bromide, or methyl sulfate to said solvent, thereby initiating free radical polymerization.

6. A method according to claim 5 wherein the components are added in sufficient quantity such that the chloride ion concentration of the reaction mixture ranges from about 1.32 weight percent to about 3.48 weight percent.

7. A method according to claim 5 wherein the components are added in sufficient quantity such that the chloride-containing salt content of the reaction mixture ranges from about 0.47 weight percent to about 0.92 weight percent.

8. A method according to claim 5 further comprising adding an aqueous solution of at least one selected from the group consisting of ceric, vanadium and manganese ions.

9. A method, according to claim 5 wherein said hydroperoxide is selected from the group consisting of hydrogen peroxide and 2-hydroperoxy-1,4-dioxycyclohexane.

10. A method according to claim 5 wherein said copolymerization is allowed to proceed for about one hour to about 200 hours and is terminated by the addition of a free radical scavenger.

11. A method according to claim 5, wherein said lignin and chloride salt are added to said solvent and then said 2-propenamide and 4N,4N-dimethyl-4-ammoniumhept-1,6-diene chloride, bromide, or methyl sulfate are added.

12. A method according to claim 11, wherein said hydroperoxide is selected from the group consisting of hydrogen peroxide and 2-hydroperoxy-1,4-dioxycyclohexane.

13. A method as set forth in claim 5, wherein said solvent comprises an organic-water solvent mixture.

14. The method according to claim 4, wherein the monomer ratio of uncharged to charged reagent ranges from about 1 to 1, to about 17 to 3.

15. The method according to claim 4, wherein reaction occurs at about room temperature.

16. The method according to claim 4, wherein the amount of said solvent ranges from about 10 to about 50 volume percent water, and from about 90 to about 50 volume percent organic solvent.

17. A method according to claim 4 wherein said copolymerizing step is conducted utilizing from about 0.5 molar percent to about 99.5 molar percent of 2-propenamide, and from about 0.5 molar percent to about 99.5 molar percent of 4N, 4N-dimethyl-4-ammoniumhept-1,6-diene chloride, bromide, or methyl sulfate.

18. A method according to claim 4 wherein said step of copolymerizing comprises: adding from about 0.32 to about 3.0 weight percent lignin, from about 1.2 to about 7.6 weight percent 2-propenamide, from about 0.2 to 7.9 weight percent of 4N,4N-dimethyl-4-ammoniumhept-1,6-diene chloride, bromide, or methyl sulfate, from about 0.6 to about 15.3 weight percent calcium chloride, from about 0.0 to about 6.1 weight percent aqueous solution of cerium (+IV), and from about 60 to about 97 weight percent solvent.

19. A method according to claim 5 wherein said solvent is selected from a group consisting of dimethyl sulfoxide, dimethyl acetamide, dimethyl formamide, 1,4-dioxane, 1-methyl-2-pyrrolidianone, and pyridine.

20. A method according to claim 5 wherein said solvent is a mixture of at least one selected from the group consisting of dimethyl sulfoxide, dimethyl acetamide, dimethyl formamide, 1,4-dioxane, 1-methyl-2-pyrrolidianone, and pyridine.

21. A method according to claim 4 wherein said copolymerization is allowed to proceed such that the total graft copolymer molecular weight is in the range of about 1,000 to 30,000,000.

22. A method, according to claim 4 further including the step of providing substantially oxygen-free environment in which to conduct said step of copolymerizing.

23. A method of thickening water or an aqueous solution which comprises adding thereto an effective amount of a positively-charged water-soluble graft copolymer of lignin (2-propenamide)-(4N,4N-dimethyl-4-ammoniumhept-1,6-diene) with neutralizing anion.

24. A method according to claim 23 wherein said anion is selected from a group consisting of chloride, bromide and sulfate.

25. A method for recovering oil from subterranean wells which comprises:
(a) dispersing or solubilizing an effective amount of a positively-charged soluble graft copolymer of lignin (2-propenamide)-(4N,4N-dimethyl-4-ammoniumhept-1,6-diene) with a neutralizing anion in injection water;
(b) injecting said dispersion or solution into the subterranean formation; and
(c) moving said injection fluid through the formation as a hydraulic ram, thereby pushing the resident oil to a production well.

26. The method for preparing a complex polymer of lignin which comprises:
(a) adding a hydroperoxide to a solvent consisting of a mixture of fluids of differing polarity such that the total solvent is highly effective in dissolving monomers to be attached to the lignin; and
(b) adding lignin, a chloride-containing salt, 2-propenamide and 4N,4N-dimethyl-4-ammoniumhept-1,6-diene chloride, bromide, or methyl sulfate to said solution, thereby initiating free radical polymerization.

27. A method for recovering oil from subterranean wells which comprises:

(a) solubilizing an amount of a positively-charged water-soluble copolymer of lignin (2-propenamide)-(4N,4N-dimethyl-4-ammoniumhept-1,6-diene) with neutralizing an ion to form a polymer solution sufficient in establishing a mobility ratio of said polymer solution to said oil to be recovered ranging from about 1.05 to about 1.8,
(b) injecting said solution into the subterranean formation; and
(c) moving said injection fluid through the formation as a hydraulic ram, thereby pushing the resident oil to a production well.

* * * * *